May 11, 1926. 1,584,463
C. J. MAIER
AUTOMOBILE OILING AND GREASING RACK
Filed June 23, 1924  2 Sheets-Sheet 2
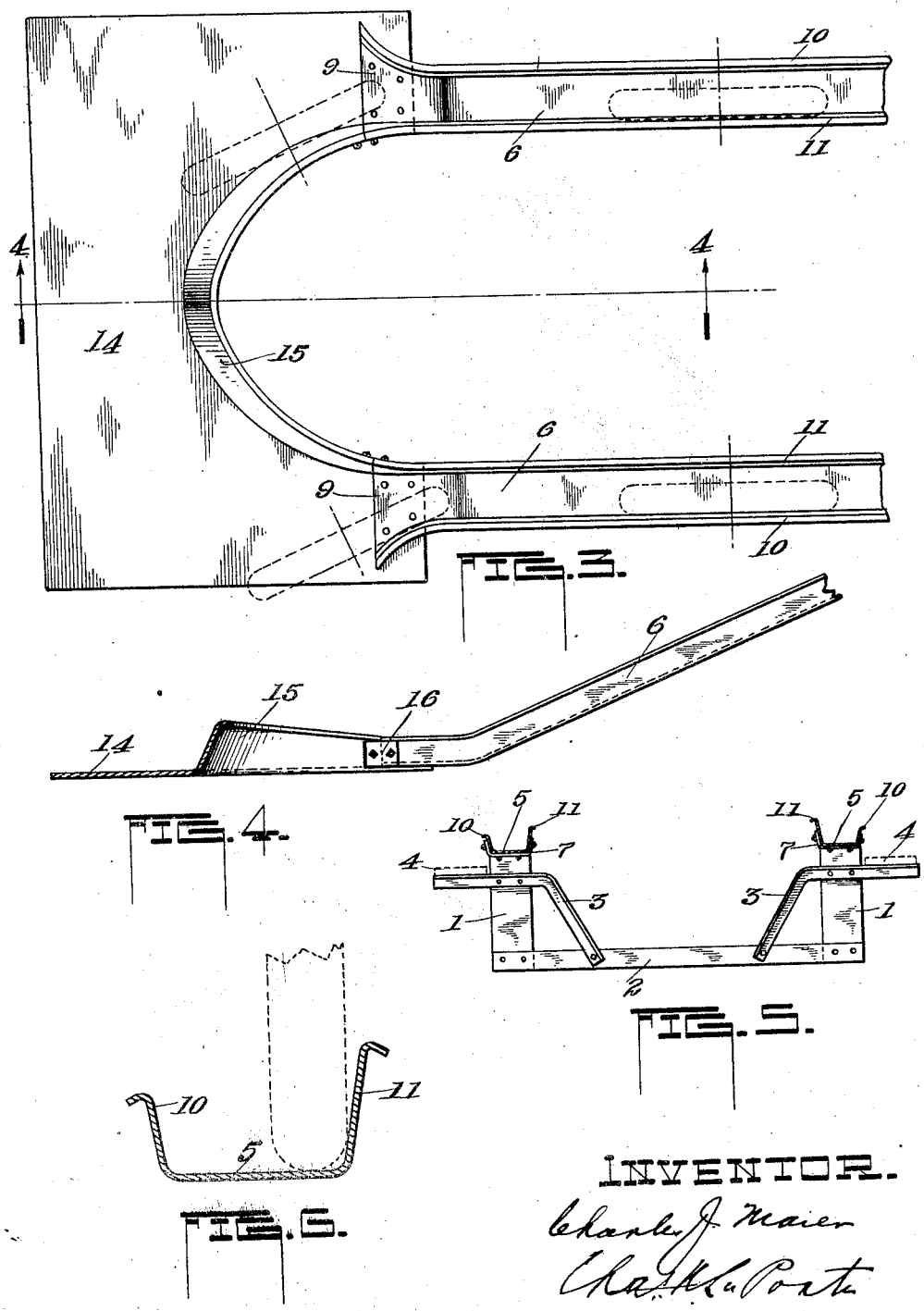

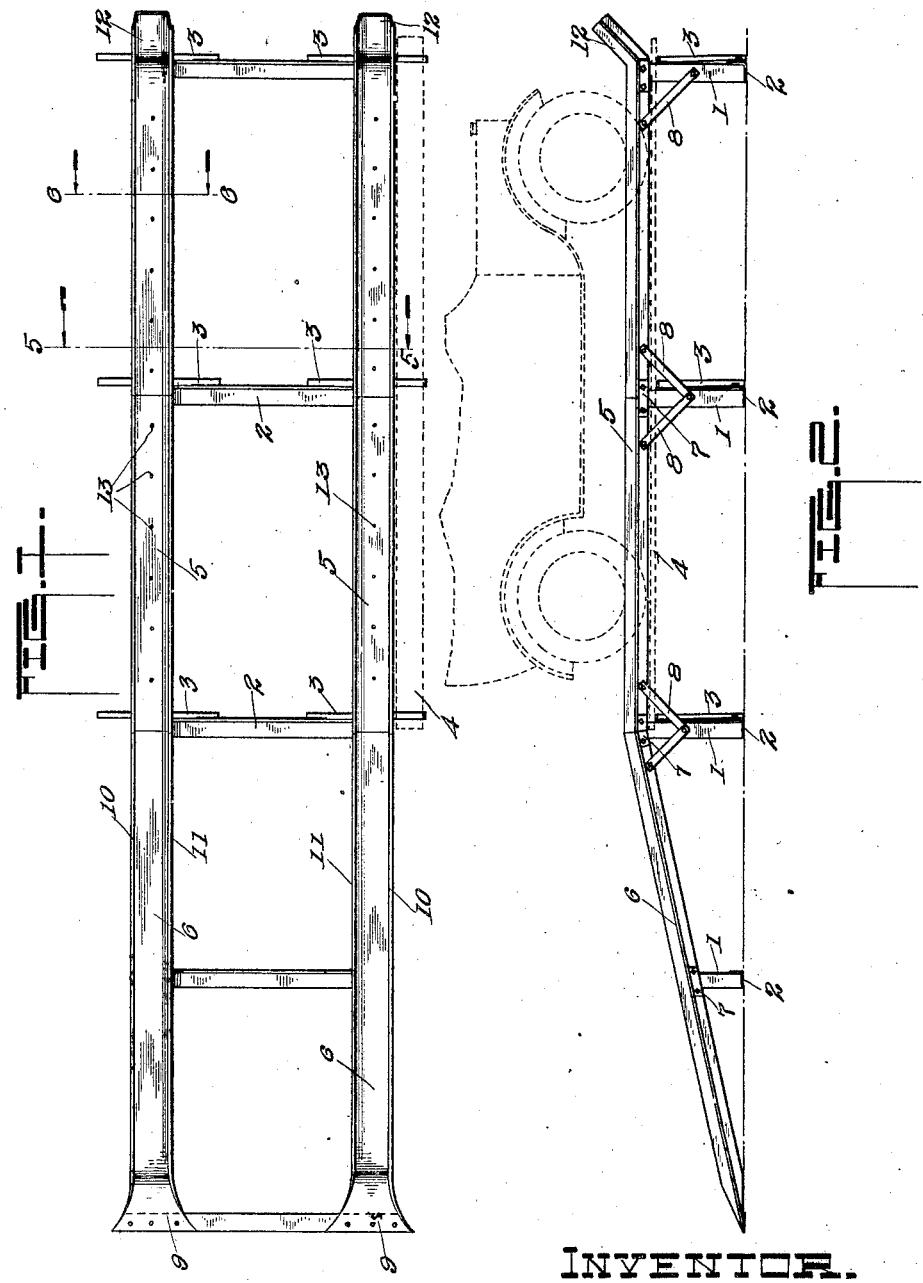

Patented May 11, 1926.

1,584,463

UNITED STATES PATENT OFFICE.

CHARLES J. MAIER, OF DECATUR, ILLINOIS, ASSIGNOR TO LEADER IRON WORKS, OF DECATUR, ILLINOIS, A CORPORATION OF ILLINOIS.

AUTOMOBILE OILING AND GREASING RACK.

Application filed June 23, 1924. Serial No. 721,665.

This invention has reference to new and useful improvements in automobile oiling and greasing rack and in particular to that type of rack designed for use in and about oiling stations where gasoline and oil for automobile use are dispensed.

One of the objects of the invention is to provide a rack including pressed steel run-ways provided with side flanges, the inner flanges of each run-way section being preferably higher than the outside flanges to prevent the automobile climbing over the run-ways on entering or leaving the rack.

The invention has for a further object to provide an oiling and greasing rack which may be knocked down for shipment, including standards and braces preferably of metal and pressed steel run-ways, which, when assembled have a skeleton-like form with the run-ways elevated to enable a workman or attendant to enter between the standards and run-ways.

A further object of the invention is to construct the run-ways of the rack from pressed steel sections having side flanges arranged to be joined to provide horizontal grooved run-ways and similar inclined approaches; the tread portions of certain or all of said sections being provided with openings stamped or otherwise formed therein to serve as drain openings in or through said sections.

A still further object of the invention is to provide an approach plate adapted to be positioned in front of the approach sections of the run-way of the rack and provided with a curved guiding flange for the wheels of an automobile, whereby the aligning of the automobile with the approach sections is unnecessary and which will guide the wheels of an automobile onto the rack.

It is also a further object of the invention to provide bracing means for the rack which project outwardly from the run-ways to provide supports for foot-boards to serve as a platform on either side of the run-ways.

That the invention may be more fully understood, reference is had to the accompanying drawings, forming a part of the description, illustrating a preferred embodiment of the invention, in which:—

Figure 1 is a plan view of a rack embodying my invention, omitting the approach plate;

Figure 2 is a side elevation of Figure 1, an automobile being shown in dotted lines to illustrate its use;

Figure 3 is an enlarged detail in plan showing the forward ends of the approach sections of the run-ways and the approach plate positioned in front and connected thereto, dotted lines showing the aligning feature for the wheels of an automobile;

Figure 4 is a detail sectional view as the same would appear on the line 4—4 Figure 3;

Figure 5 is a cross-section as the same would appear on the line 5—5 Figure 1, and Figure 6 is a cross-section of a pressed steel run-way as the same would appear on the line 6—6 Figure 1.

Like characters of reference denote corresponding parts throughout the figures.

In Figures 1 and 2 the rack is shown with inclined approach sections to the run-way only at one end and with upwardly inclined stops at the other end, but it must be borne in mind that the rack may be provided with inclined approaches at either end. Also Figures 1 and 2 do not show the approach plate of Figures 3 and 4. This is for the reason that it may or may not be used, but is preferable because it relieves the driver of the automobile of the necessity of aligning his automobile with the run-ways and all he need do is to direct the front wheels onto the approach sections and the guide of the approach plate will insure the rear wheels following into the grooved approach sections, even if approaching at an angle, see Figure 3. With or without the approach plate, the entrance ends of the approach sections are outwardly flared.

Referring specifically to the detailed structure, the rack comprises a plurality of sets of spaced standards or uprights 1, preferably of channel iron connected by bottom cross-braces 2, preferably of angle iron and certain of said uprights or standards and said cross braces being connected and braced by the angular braces 3, preferably of angle iron, which project out and beyond the uprights or standards 1 to provide rests or supports, see Figure 5, for foot boards 4, shown in dotted lines which provide a platform running longitudinally along either side of the rack to and from which may lead steps, at either end, if desired, but which are not shown.

The uprights or standards support runways including the horizontal sections 5 and the inclined approach sections 6. These sections are each and all preferably pressed steel sections having the cross-section best seen in Figures 5 and 6. The abutting ends of the sections preferably meet on an upright or standard 1 and rest in and are connected by chairs 7, and the adjacent ends of certain of said sections and said uprights or standards braced by the angularly disposed plate braces 8, see Figure 2. The lower ends of the inclined approach sections 6 lie horizontal and are flared or spread, as at 9 to provide enlarged or spread entrance ends to the run-ways for the convenient entrance of wheels thereinto.

Said sections 5 and 6 are preferably formed trough-like, see Figures 5 and 6 with side flanges 10 and 11, the latter being the inner flanges and higher than the flanges 10 so as to prevent climbing of the automobile over the sides of the run-ways when entering or leaving the same. I prefer that the flanges shall be slightly inclined upwardly and outwardly and their upper edges bent over and slightly downward to present smooth upper edges, give a neat appearance to the runways and strengthen the same. In the event that the rack has inclined approaches only at one end, as shown in Figures 1 and 2, then the rear sections 5 have upturned ends 12 to provide stops or abutments. Also certain or all of the run-way sections may be provided with openings 13 providing a means of draining the said sections.

An approach plate 14 is preferably positioned at the forward ends of and connected to the approach sections 6. The greater portion of this plate is preferably flat and provided with an arcuate upstanding and inclined deflecting flange 15 the ends of which abut with and are connected to the forward ends of the flanges 11 of the sections 6 by means of plates 16, see Figure 4. By the use of this plate aligning all the wheels of an automobile with the run-ways may be avoided and only the front wheels run onto the approach sections 6, said flange 16 of the plate 14 directing the rear wheels into the run-ways somewhat as is shown by the dotted lines in Figure 3. Said flange, as shown is shallowest at its opposite ends to unite with and form a continuation of the ends of said inner flanges of the approaches 6.

What I claim is:—

1. In an automobile oiling and greasing rack, in combination, a plurality of sets of metallic standards, parallel arranged runways supported on said standards comprising a series of sections certain of which are supported horizontally and others inclined thereto, each of said sections being trough-like in cross-section the inner flanged walls of which are higher than the outside flanges to prevent climbing of wheels thereover, and an approach plate adapted to be positioned at the entrance ends of said inclined sections and provided with an outwardly presented arcuate shaped upstanding flange the inner ends of which abut with the inside flanges of said approach sections to the run-ways.

2. In an automobile oiling and greasing rack, in combination with horizontal runways and inclined approaches, of an approach plate adapted to be positioned at the entrance ends of said approaches and provided with an outwardly presented upstanding arcuate deflecting flange.

3. An approach plate for the purposes specified, comprising a plate flat for the greater portion of its surface and provided with an arcuate shaped upstanding flange the shallowest portions of said flange being at its opposite ends.

In witness whereof, I have hereunto affixed my hand this 19th day of June 1924.

CHARLES J. MAIER.